United States Patent
Ulrich et al.

(10) Patent No.: US 7,480,046 B2
(45) Date of Patent: Jan. 20, 2009

(54) SCANNING MICROSCOPE WITH EVANESCENT WAVE ILLUMINATION

(75) Inventors: Heinrich Ulrich, Heldelberg (DE); Werner Knebel, Kronau (DE); Kyra Moellmann, Trippstadt (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 270 days.

(21) Appl. No.: 10/573,435

(22) PCT Filed: Sep. 23, 2004

(86) PCT No.: PCT/EP2004/052296

§ 371 (c)(1), (2), (4) Date: Mar. 24, 2006

(87) PCT Pub. No.: WO2005/029151

PCT Pub. Date: Mar. 31, 2005

(65) Prior Publication Data

US 2007/0052958 A1 Mar. 8, 2007

(30) Foreign Application Priority Data

Sep. 25, 2003 (DE) ................ 103 44 410

(51) Int. Cl.
*G01J 3/30* (2006.01)
*G01N 21/63* (2006.01)
*G02B 21/06* (2006.01)

(52) U.S. Cl. ................ 356/317; 356/417; 359/385

(58) Field of Classification Search ................ 359/385, 359/389, 390; 356/317, 318, 417
See application file for complete search history.

(56) References Cited

U.S. PATENT DOCUMENTS

| 6,255,642 | B1 | 7/2001 | Cragg et al. ................ 250/216 |
| 6,987,609 | B2 * | 1/2006 | Tischer et al. ................ 359/385 |
| 2002/0097489 | A1 | 7/2002 | Kawano et al. ............. 359/388 |
| 2003/0058530 | A1 | 3/2003 | Kawano ..................... 359/385 |

FOREIGN PATENT DOCUMENTS

DE 199 02 234 A1 2/2000
WO WO 03/023483 A2 * 3/2003

OTHER PUBLICATIONS

V. Protasenko et al.: "Enhancement and quenching of the fluorescence of single CdSe/ZnS quantum dots studied by confocal apertureless near-field scanning optical microscope"; Proceedings of SPIE vol. 5188 Advanced Characterization Techniques for Optics, Semiconductors, and Nanotechnologies, Nov. 2003, pp. 254-263.
S. Kawata et al.: "Near-Field Scanning Optical Microscope with a Laser Trapped Probe"; Jpn. J. Appl. Phys. vol. 33 (1994), Part 2, No. 12A, Dec. 1, 1994, pp. L 1725-L 1727.
International Search Report for PCT/EP2004/052296 (3 pages).

* cited by examiner

*Primary Examiner*—F. L Evans
(74) *Attorney, Agent, or Firm*—Darby & Darby

(57) ABSTRACT

A scanning microscope includes a light source for evanescently illuminating a sample disposed on a slide. A point detector receives detection light emanating from a scanning point of the sample. A beam deflection device disposed in an optical path of the detection light can shift a position of the scanning point.

22 Claims, 4 Drawing Sheets

SCANNING MICROSCOPE WITH EVANESCENT WAVE ILLUMINATION

The present invention relates to a scanning microscope.

BACKGROUND

In scanning microscopy, a sample is illuminated with a light beam in order to observe the detection light emitted, as reflected or fluorescent light, from the sample. The focus of an illuminating light beam is moved in a sample plane using a controllable beam deflection device, generally by tilting two mirrors; the deflection axes usually being perpendicular to one another so that one mirror deflects in the x-direction and the other in the y-direction. Tilting of the mirrors is brought about, for example, by galvanometer positioning elements. The power of the detection light coming from the sample is measured as a function of the position of the scanning beam. The positioning elements are usually equipped with sensors to determine the current mirror position. In confocal scanning microscopy specifically, a sample is scanned in three dimensions with the focus of a light beam.

A confocal scanning microscope generally includes a light source, a focusing optical system used to focus the light of the source onto a pinhole (called the "excitation pinhole"), a beam splitter, a beam deflection device for beam control, a microscope optical system, a detection pinhole, and the detectors for detecting the detection or fluorescent light. The illuminating light is coupled in via a beam splitter. The fluorescent or reflected light coming from the sample travels back via the beam deflection device to the beam splitter, passes through it, and is then focused onto the detection pinhole behind which the detectors are located. This detection arrangement is called a "descan" arrangement. Detection light that does not derive directly from the focus region takes a different light path and does not pass through the detection pinhole, so that point information is obtained which, by sequential scanning of the sample with the focus of the illuminating light beam, results in a three-dimensional image. A three-dimensional image is usually achieved by acquiring image data in layers.

United States Patent Application US 2002/0097489 A1 describes a microscope providing evanescent wave illumination of a sample. The microscope contains a white light source, whose light passes through a slit aperture and the microscope objective and is coupled into the sample-carrying slide to provide evanescent wave illumination. The illuminating light propagates in the slide by total internal reflection, the illumination of the sample occurring only in the area of the evanescent field protruding from the slide. Microscopes of this type are known by the term TIRFM (Total Internal Reflection Fluorescent Microscope).

The z-resolution of TIRF microscopes is extremely good because the evanescent field extends only about 100 nm into the sample.

SUMMARY OF THE INVENTION

It is an object of the present invention to provide a scanning microscope with which the advantages of both evanescent wave illumination and scanning microscopy can be used.

The present invention provides a scanning microscope having a light source which evanescently illuminates a sample placed on a slide, further having a point detector which receives detection light emanating from a scanning point of the sample, and further having a beam deflection device disposed in the optical path of the detection light for shifting the position of the scanning point in the sample.

The present invention has the advantage that it enables two-dimensional or three-dimensional scanning of the sample and provides highly increased resolution in the z-direction.

Scanning of the sample in the lateral directions (xy-directions) is accomplished using the beam deflection device disposed in the optical path of the detection light. Scanning of the sample in the axial direction (z-direction) can be done by adjusting the relative distance between the sample and the objective lens. To this end, it is possible either to place the sample on a height-adjustable stage, or to use an objective lens that is adjustable in the z-direction.

The illuminating light can preferably be coupled into the cover slip of the sample through the objective lens of the scanning microscope. In another variant, the illuminating light is coupled into the slide through the condenser of the scanning microscope. In yet another variant, neither the objective lens nor the condenser is used to couple light into the slide, but, for example, a prism is used instead.

The illuminating light is preferably passes through the outer edge region of the pupil of the objective lens to ensure that the critical angle of total reflection is reached in the cover slip. Preferably, the illuminating light is formed into an illuminating light beam which is preferably focused in the plane of the objective pupil. The illuminating light beam can remain stationary during the examination of a sample. In a preferred variant, the illuminating light beam can be swept in circles through the outer region of the objective pupil using an additional beam deflection device. Advantageously, a very homogenous and uniform illumination is achieved in this manner.

Preferably, the objective lens has a numerical aperture greater than 1.3, and advantageously between 1.35 and 1.42.

In one preferred embodiment, a color-selective segmented aperture is located in the optical path of the illuminating light, preferably in the plane of the objective pupil. The optical properties in the outer edge region of the color-selective segmented aperture are different from those in the inner region thereof. Preferably, the outer edge region of the color-selective segmented aperture is transparent to light having the wavelength of the illuminating light, while the inner region is transparent only to light having a wavelength greater than that of the illuminating light. This embodiment variant is preferable especially for fluorescence applications, where the wavelength of the detection light is, by nature, greater than the wavelength of the illuminating light.

In another variant, the inner region of the color-selective segmented aperture is transparent only to light having a wavelength below that of the illuminating light. This variant is suitable especially for multiphoton excitation of the sample. In this case, the illuminating light is preferably pulsed infrared light.

The color-selective segmented aperture prevents illuminating light from passing through the objective lens outside the outer edge region and directly illuminating the sample.

In a preferred embodiment variant, the illuminating light includes a plurality of wavelengths. In this variant, for example, a plurality of different sample dyes can be optically excited simultaneously.

The point detector preferably contains a detection pinhole located in a plane conjugate to the focal plane of the objective lens. The spatial positions of the scanning points from where the point detector can receive detection light are determined by the position of the detection pinhole and the position of the beam deflection device.

In a preferred variant, the point detector includes a multiband detector or a spectrometer, which makes it possible to obtain spectral point information from the sample. This embodiment variant is particularly advantageous when combined with multicolor illumination.

The scanning microscope of the present invention can additionally be configured as a confocal scanning microscope, thereby enabling confocal examination of the sample through the inner region of the color-selective segmented aperture while at the same time allowing TIRF illumination through the outer region of the color-selective segmented aperture.

Imaging optics, preferably a Bertrand lens, is provided in the optical path of the illuminating light in order to focus the illuminating light beam in the plane of the objective pupil.

In a preferred embodiment, the light path of the detection light includes a plurality of detection channels, which may each have a bandpass filter provided therein.

BRIEF DESCRIPTION OF THE DRAWINGS

Exemplary embodiments of the present invention are schematically illustrated in the drawings and will be described below with reference to the Figures, wherein like elements are designated by like numerals and, wherein.

DETAILED DESCRIPTION

Figure 1:
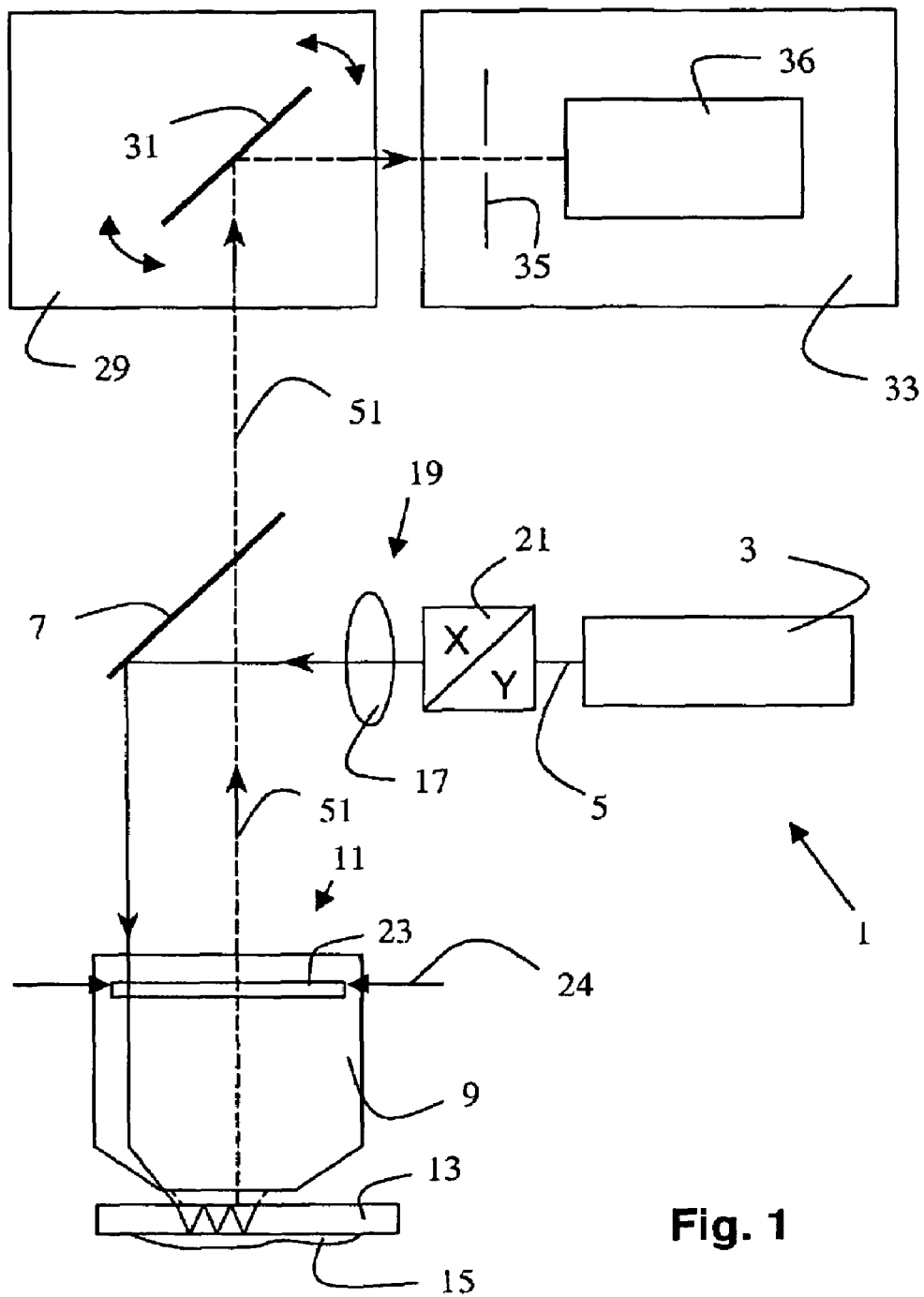
FIG. 1 shows a scanning microscope according to the present invention.
Figure 2:
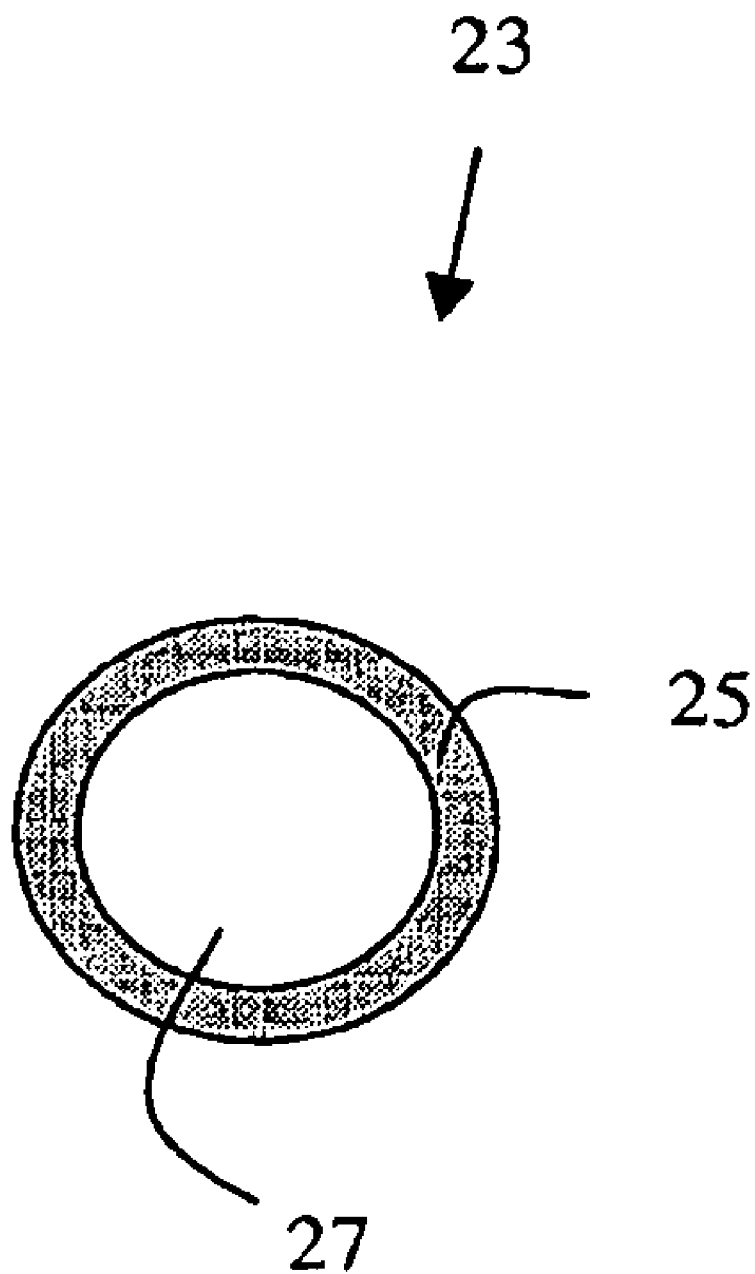
FIG. 2 depicts a color-selective segmented aperture.

FIG. 1 shows a scanning microscope according to the present invention, having a light source 1 in the form of an argon ion laser 3. Light source 1 generates an illuminating light beam 5, which is reflected by a beam splitter 7 toward objective lens 9. Illuminating light beam 5 passes through the outer edge region of the objective pupil 11, as indicated by double arrow 24, and is coupled into cover slip 13 of sample 15 to provide evanescent wave illumination. Disposed in the optical path of illuminating light beam 5 is imaging optics 19, which takes the form of a Bertrand lens 17 and forms a focus in the plane of objective pupil 11. An additional beam deflection device 21 containing a gimbal-mounted scanning mirror (not shown) is also located in the optical path of illuminating light beam 5. The additional beam deflection device sweeps the focus of the illuminating light beam continuously in circles through the outer edge region of objective pupil 11, whereby a particularly homogenous evanescent wave illumination is achieved. Color-selective segmented aperture 23, which is depicted in FIG. 2, is disposed in the plane of objective pupil 11. Color-selective segmented aperture 23 has an outer edge region 25, which is transparent to the illuminating light, as well as an inner region 27, which is transparent to light having a wavelength greater than that of the illuminating light. Detection light 51 emanating from the sample travels through the objective lens and the inner region of the color-selective segmented aperture to beam splitter 7, passes through it, and reaches point detector 33 via beam deflection device 29, which contains a gimbal-mounted scanning mirror 31. Point detector 33 contains a detection pinhole 35, whose spatial position in conjunction with the position of gimbal-mounted scanning mirror 31 determines the position of the scanning point in the sample, from where point detector 33 receives detection light 51. Point detector 33 includes a multiband detector 36, which is capable of simultaneously receiving light in a plurality of settable wavelength bands. The illuminating light beam of argon ion laser 3 includes illuminating light of a plurality of wavelengths, which allows multicolor excitation of the sample.

Figure 3:
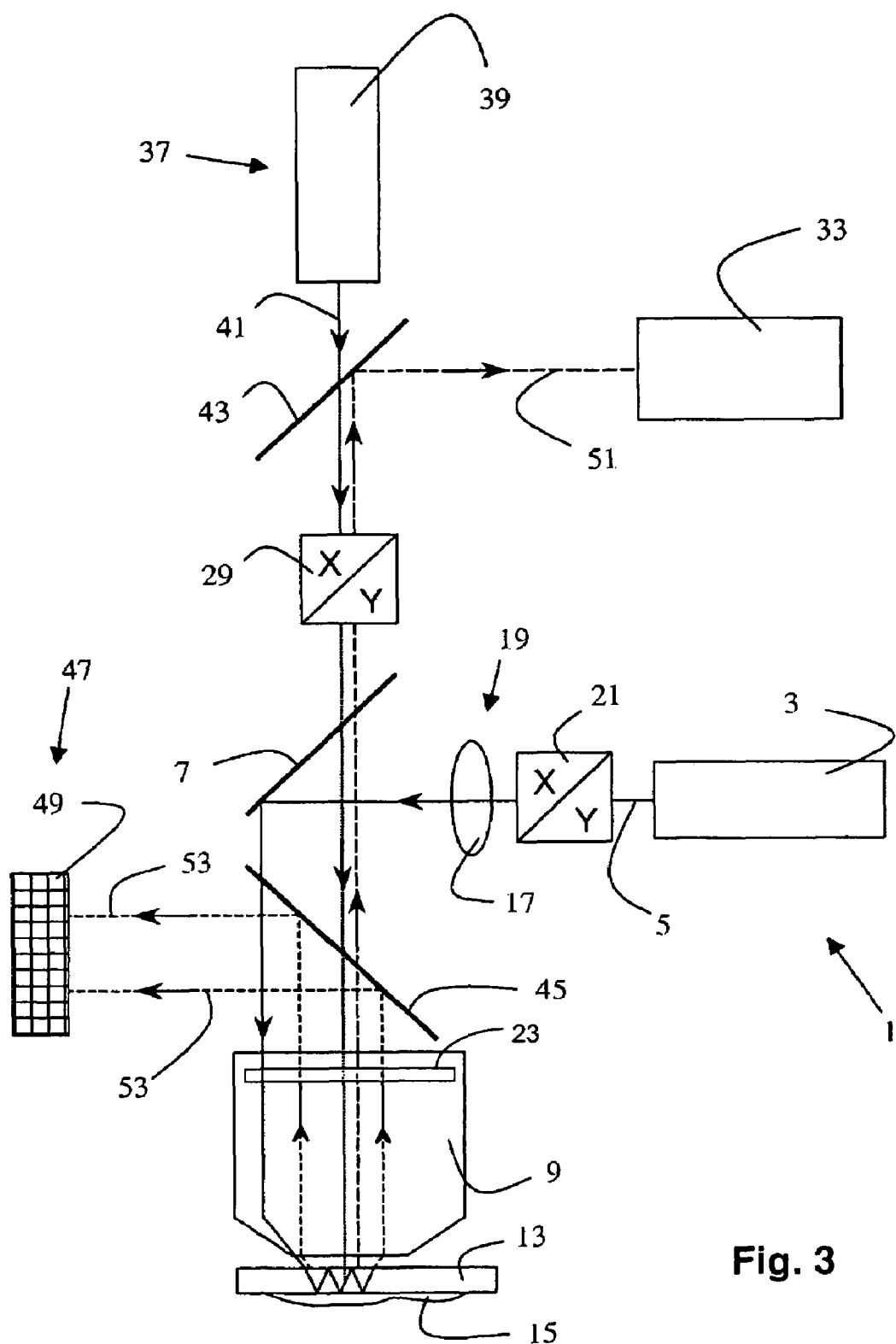
FIG. 3 shows another scanning microscope according to the present invention.

FIG. 3 shows another scanning microscope according to the present invention, in which confocal examination of a sample can be carried out simultaneously with the TIRF examination. This scanning microscope contains an additional light source 37, which takes the form of a pulsed titanium-sapphire laser 39 and emits an additional illuminating light beam 41. Additional illuminating light beam 41 passes through a second beam splitter 43, beam deflection device 29, and through beam splitter 7 and a third beam splitter 45 to objective lens 9, and illuminates sample 15 directly through inner region 27 of segmented aperture 23. In sample 15, additional illuminating light beam 41 causes two-photon excitation of the sample, independently of the TIRF illumination with illuminating light beam 5. The two-photon excitation of the sample produces additional detection light 53, which is detected by a non-descan detector 47 in the form of a CCD element 49. This additional detection light 53 passes through the inner region of the objective lens and is reflected by third beam splitter 45 to non-descan detector 47. In this scanning microscope, a different color-selective segmented aperture is inserted in the pupil of the objective lens. The outer edge region of said different color-selective segmented aperture is transparent to illuminating light beam 5 of light source 1, while the inner region is designed to reflect this light. This ensures that no illuminating light is directly incident on the sample. Beam splitters 7, 45 and 43 are designed such that neither the light of illuminating light beam 5 nor the light of titanium-sapphire laser 39 can reach point detector 33 or non-descan detector 47.

Figure 4:
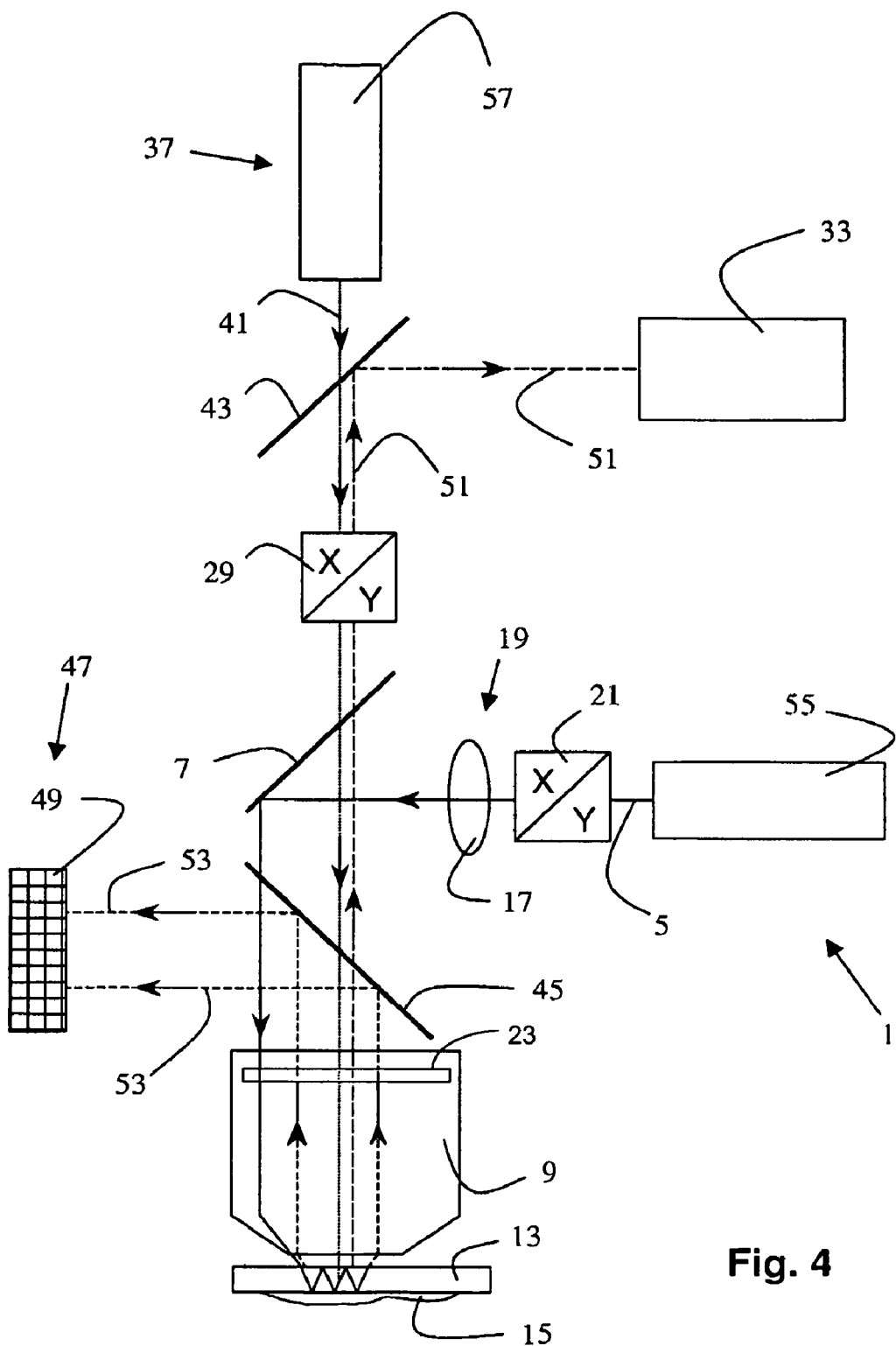
FIG. 4 shows a further scanning microscope according to the present invention.

FIG. 4 shows another possible variant of the scanning microscope according to the present invention. In this case, light source 1 is composed of a titanium-sapphire laser 55 emitting an illuminating light beam 5, which is directed through outer edge region 25 of a color-selective segmented aperture to provide TIRF illumination. The evanescent wave illumination induces multiphoton excitation in sample 15. The resulting fluorescent light passes through the whole segmented aperture 23 and, via third beam splitter 45, to non-descan detector 47, which is in the form of a CCD element 49. Immediately after that, a three-dimensional image of the sample is obtained by confocally illuminating it with a light source 37 composed of an argon ion laser 57, and by performing detection using a point detector 33 in the form of a multiband detector 36.

The present invention has been explained with reference to a specific embodiment. However, it is apparent that changes and modifications can be made without exceeding the scope of the following claims.

LIST OF REFERENCE NUMERALS 1 light source
3 argon ion laser
5 illuminating light beam
7 beam splitter
9 objective lens
11 objective pupil
13 cover slip
15 sample
17 Bertrand lens
19 imaging optics 21 beam deflection device
23 segmented aperture
24 double arrow
25 outer edge region
27 inner region
29 beam deflection device
31 scanning mirror
33 point detector
35 detection pinhole
36 multi-band detector
37 light source
39 titanium-sapphire laser
41 illuminating light beam
43 second beam splitter
45 third beam splitter
47 non-descan detector
49 CCD element
51 detection light
53 detection light
55 titanium-sapphire laser
57 argon ion laser

What is claimed is:

1. A scanning microscope comprising:
   a light source configured to evanescently illuminate a sample disposed on a slide;
   a point detector configured to receive detection light emanating from a scanning point of the sample;
   a beam deflection device disposed in an optical path of the detection light and configured to shift a position of the scanning point; and
   a color-selective segmented aperture disposed in an optical path of the illuminating light.

2. The scanning microscope as recited in claim 1 wherein the light source is configured to evanescently illuminate the sample by providing illuminating light, the illuminating light being coupled into the slide or into a cover slip of the sample.

3. The scanning microscope as recited in claim 2 further comprising an objective lens configured to couple the illuminating light into the cover slip through the objective lens.

4. The scanning microscope as recited in claim 3 wherein the objective lens has an objective pupil, the illuminating light passing through an outer edge region thereof.

5. The scanning microscope as recited in claim 4 wherein the illuminating light propagates in an illuminating light beam.

6. The scanning microscope as recited in claim 4 wherein the illuminating light beam forms a focus in a plane of the objective pupil.

7. The scanning microscope as recited in claim 5 further comprising an additional beam deflection device disposed in an optical path of the illuminating light and configured to change a spatial position of the illuminating light beam.

8. The scanning microscope as recited in claim 7 wherein the additional beam deflection device is configured to direct the illuminating light beam in circles through the outer edge region of the objective pupil.

9. The scanning microscope as recited in claim 3 wherein the objective lens has a numerical aperture greater than 1.3.

10. The scanning microscope as recited in claim 9 wherein the objective lens has a numerical aperture between 1.35 and 1.42.

11. The scanning microscope as recited in claim 1 further comprising an objective lens having an objective pupil, and wherein the color-selective segmented aperture is disposed in a plane of the objective pupil.

12. The scanning microscope as recited in claim 1 wherein an outer edge region of the color-selective segmented aperture is transparent to light having a wavelength of the illuminating light.

13. The scanning microscope as recited in claim 12 wherein an inner edge region of the color-selective segmented aperture is transparent only to light having a wavelength greater than the wavelength of the illuminating light.

14. The scanning microscope as recited in claim 12 wherein an inner edge region of the color-selective segmented aperture is transparent only to light having a wavelength below the wavelength of the illuminating light.

15. The scanning microscope as recited in claim 14 wherein the illuminating light includes pulsed infrared light.

16. The scanning microscope as recited in claim 1 wherein the illuminating light includes a plurality of wavelengths.

17. The scanning microscope as recited in claim 1 wherein the point detector includes at least one of a multi-band detector and a spectrometer.

18. The scanning microscope as recited in claim 1 wherein the point detector includes a detection pinhole.

19. The scanning microscope as recited in claim 1 further comprising a scanning unit configured to provide confocal scanning.

20. A scanning microscope comprising:
    a light source configured to evanescently illuminate a sample disposed on a slide;
    a point detector configured to receive detection light emanating from a scanning point of the sample; and
    a beam deflection device disposed in an optical path of the detection light and configured to shift a position of the scanning point;
    wherein the point detector includes at least one of a multi-band detector and a spectrometer.

21. A scanning microscope comprising:
    a light source configured to evanescently illuminate a sample disposed on a slide;
    a point detector configured to receive detection light emanating from a scanning point of the sample; and
    a beam deflection device disposed in an optical path of the detection light and configured to shift a position of the scanning point;
    wherein the point detector includes a detection pinhole.

22. A scanning microscope comprising:
    a light source configured to evanescently illuminate a sample disposed on a slide;
    a point detector configured to receive detection light emanating from a scanning point of the sample;
    a beam deflection device disposed in an optical path of the detection light and configured to shift a position of the scanning point; and
    a scanning unit configured to provide confocal scanning.

* * * * *